US012459277B2

(12) United States Patent
Nihashi et al.

(10) Patent No.: US 12,459,277 B2
(45) Date of Patent: Nov. 4, 2025

(54) PRINTER WITH A FLAPPER FOR PRESSING A SHEET IN A HOUSING

(71) Applicant: TOSHIBA TEC KABUSHIKI KAISHA, Tokyo (JP)

(72) Inventors: Kiyotaka Nihashi, Mishima Shizuoka (JP); Kenji Eoka, Singapore (SG)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 67 days.

(21) Appl. No.: 18/073,479

(22) Filed: Dec. 1, 2022

(65) Prior Publication Data

US 2023/0339245 A1 Oct. 26, 2023

(30) Foreign Application Priority Data

Apr. 25, 2022 (JP) ................................ 2022-071251

(51) Int. Cl.
*B41J 15/04* (2006.01)
*B41J 11/00* (2006.01)

(52) U.S. Cl.
CPC ........... *B41J 15/04* (2013.01); *B41J 11/0075* (2013.01); *B41J 15/042* (2013.01)

(58) Field of Classification Search
CPC ....... B41J 15/04; B41J 11/0075; B41J 15/042
See application file for complete search history.

(56) References Cited

U.S. PATENT DOCUMENTS

| | | | | |
|---|---|---|---|---|
| 9,597,903 | B1 | 3/2017 | Hsu | |
| 10,457,515 | B2 * | 10/2019 | Hagi | B41J 15/04 |
| 10,960,691 | B2 | 3/2021 | Yazawa et al. | |
| 2006/0044381 | A1 | 3/2006 | Osakama | |
| 2008/0095564 | A1 * | 4/2008 | Yada | B41J 15/042 400/613 |
| 2012/0224906 | A1 | 9/2012 | Nihashi | |
| 2019/0291481 | A1 | 9/2019 | Yazawa et al. | |

FOREIGN PATENT DOCUMENTS

| | | | |
|---|---|---|---|
| CN | 107225870 | A | 10/2017 |
| JP | H2-46761 | U | 3/1990 |
| JP | 2008-120069 | A | 5/2008 |
| JP | 2012-179860 | A | 9/2012 |
| JP | 2014-001017 | A | 1/2014 |

(Continued)

OTHER PUBLICATIONS

Extended European Search Report mailed Sep. 7, 2023, in corresponding European Patent Application No. 23157014.4, 7 pages.

(Continued)

*Primary Examiner* — Henok D Legesse
(74) *Attorney, Agent, or Firm* — Kim & Stewart LLP

(57) ABSTRACT

A printer includes a housing in which a sheet is stored in a rolled shape, a head by which an image is printed on the sheet, a flapper configured to pivot around an axis at a first end thereof including a surface extending from the first end to a second end of the flapper and biased to press the stored sheet against the housing, and a protrusion at the first end of the flapper that rotates around the axis as the flapper pivots, a sensor, and a controller configured to issue a signal when the protrusion is rotated around the axis to move into a detection range of the sensor.

20 Claims, 8 Drawing Sheets

(56) References Cited

FOREIGN PATENT DOCUMENTS

| | | | |
|---|---|---|---|
| JP | 2015-016668 | A | 1/2015 |
| JP | 2016-028975 | A | 3/2016 |
| JP | 2016-40194 | A | 3/2016 |
| JP | 2018-8468 | A | 1/2018 |
| JP | 2019-038196 | A | 3/2019 |

OTHER PUBLICATIONS

Notice of Reasons for Refusal mailed Sep. 3, 2024 in corresponding Japanese Patent Application No. 2021-035656, 8 pages (with Translation).

* cited by examiner

PRINTER WITH A FLAPPER FOR PRESSING A SHEET IN A HOUSING

CROSS-REFERENCE TO RELATED APPLICATION(S)

This application is based upon and claims the benefit of priority from Japanese Patent Application No. 2022-071251, filed Apr. 25, 2022, the entire contents of which are incorporated herein by reference.

FIELD

Embodiments described herein relate generally to a printer.

BACKGROUND

Conventionally, a printer that can print an image on a rolled sheet is used in a store or the like. The rolled sheet is formed by winding a print sheet in a roll shape. The printer prints an image after pulling out a part of the print sheet from the rolled sheet. In addition, in order to reduce the time and effort for the operator to replace the rolled sheet, a so-called drop-in method has been proposed in which the rolled sheet can be loaded only by inserting the rolled sheet into a storage unit of the printer.

In such a drop-in printer, since the core of the rolled sheet is not fixed to the storage unit, when printing is performed, the rolled sheet is pulled out from the rolled sheet in the sheet discharge direction, and the rolled sheet is irregularly moved inside the printer. This movement makes it difficult for the printer to detect that the printing sheet is close to being out of paper.

To prevent that movement, there is a known printer with a pressing roller that presses the rolled sheet from the downstream side (i.e., sheet discharge side) toward the upstream side (i.e., rolled sheet side).

However, in such a printer, the direction in which the rolled sheet is pressed and the direction in which the print sheet is pulled out are opposite to each other. Thus, when the printer main body is placed vertically, if the remaining amount of the rolled sheet decreases, the rolled sheet may slip down in the gravitational direction. Further, when the rolled sheet slips down, there is a case where it is not possible to detect that the rolled sheet is close to the paper shortage.

SUMMARY OF THE INVENTION

Embodiments provide a drop-in printer capable of accommodating a print sheet in a storage unit even in a state where the remaining amount of the print sheet is small.

In one embodiment, a printer includes a housing in which a sheet is stored in a rolled shape, a head by which an image is printed on the sheet, a flapper configured to pivot around an axis at a first end thereof including a surface extending from the first end to a second end of the flapper and biased to press the stored sheet against the housing, and a protrusion at the first end of the flapper that rotates around the axis as the flapper pivots, a sensor, and a controller configured to issue a signal when the protrusion is rotated around the axis to move into a detection range of the sensor.

DETAILED DESCRIPTION

Hereinafter, a thermal printer 10 according to an embodiment of the present invention will be described in detail with reference to the accompanying drawings.

(Overall Configuration of Thermal Printer 10)

Figure 1:
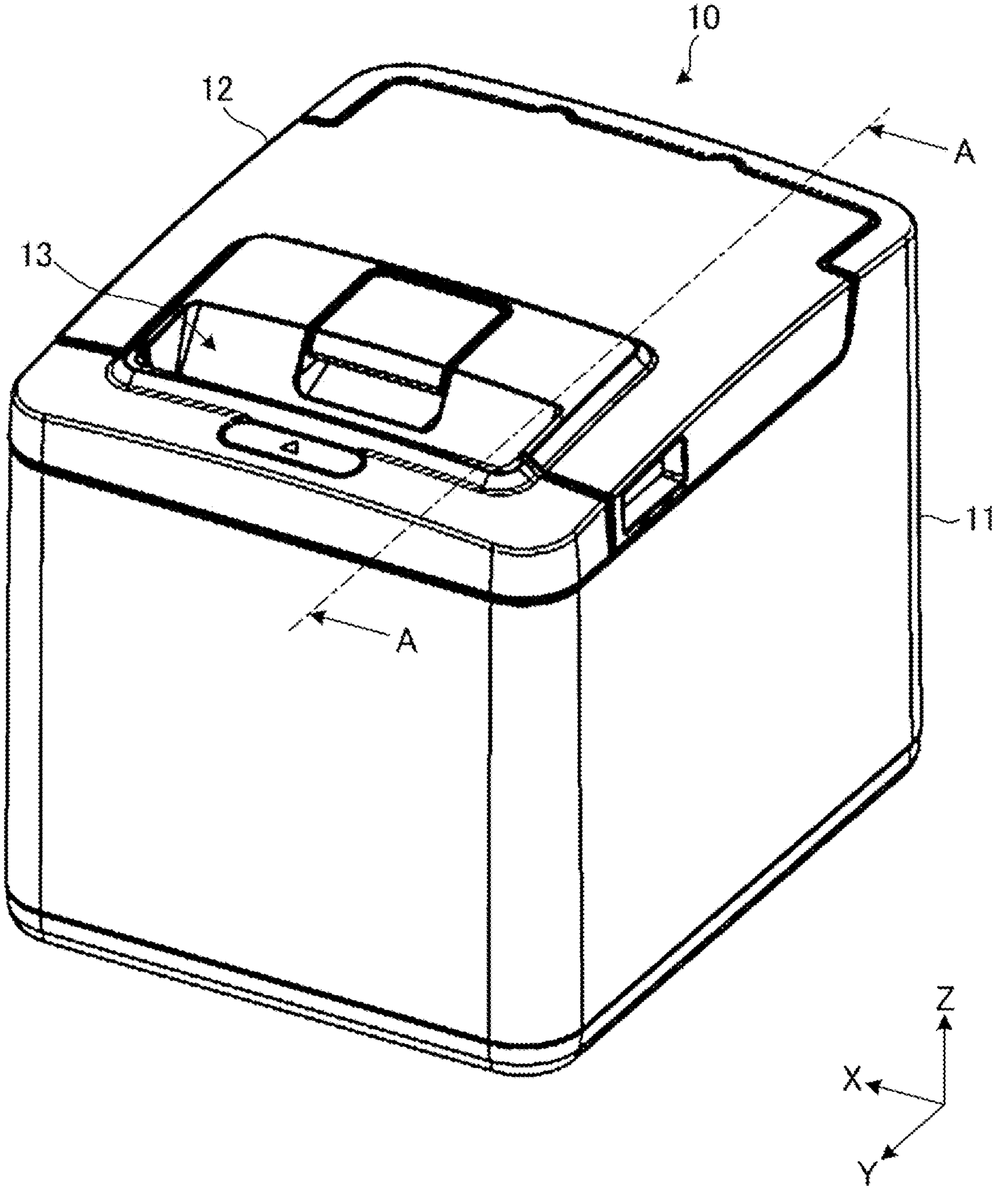
FIG. 1 is a perspective view of an external appearance of a thermal printer according to an embodiment.

An overall configuration of the thermal printer 10 according to an embodiment will be described with reference to FIG. 1. FIG. 1 is a perspective view illustrating an example of an external appearance of the thermal printer 1.

Further, in the drawings described below, for convenience, the X-axis, the Y-axis, and the Z-axis orthogonal to each other are shown, and the left-right direction (X-direction), the front-rear direction (Y-direction), and the up-down direction (Z-direction) in the thermal printer 1 be described using the X-axis, the Y-axis, and the Z-axis. In the following description, when simply referred to as the X direction, the Y direction, or the Z direction, it is the respective axial directions, and includes two directions in opposite directions. In addition, when the positive direction of the X-axis is specified, the direction is one direction from the right side to the left side, when the positive direction of the Y-axis is specified, the direction is one direction from the rear side to the front side, and when the positive direction of the Z-axis is specified, the direction is one direction from the lower side to the upper side.

The thermal printer 1 includes a lower housing 11, an upper cover 12, and a discharge port 13. The lower housing 11 is a box-shaped container in which an opening is provided along its upper surface. The lower housing 11 is provided with a connection terminal (not shown) used for connection with an external device such as a host computer for managing the thermal printer 1, a power supply terminal (not shown) for supplying power to the printer 1, and the like. The upper cover 12 covers a storage unit 18 disposed in the lower housing 11 (see FIG. 2). The upper cover 12 is rotatably supported along one end of the lower housing 11, and covers the opening of the lower housing 11 in accordance with the rotation.

The discharge port 13 is a gap-shaped opening through which a sheet is discharged, and the opening is formed between the other end of the upper cover 12 and the lower housing 11. The lower housing 11 and the upper cover 12 constitute the housing 10.

(Internal Structure of Thermal Printer 10)

Figure 2:
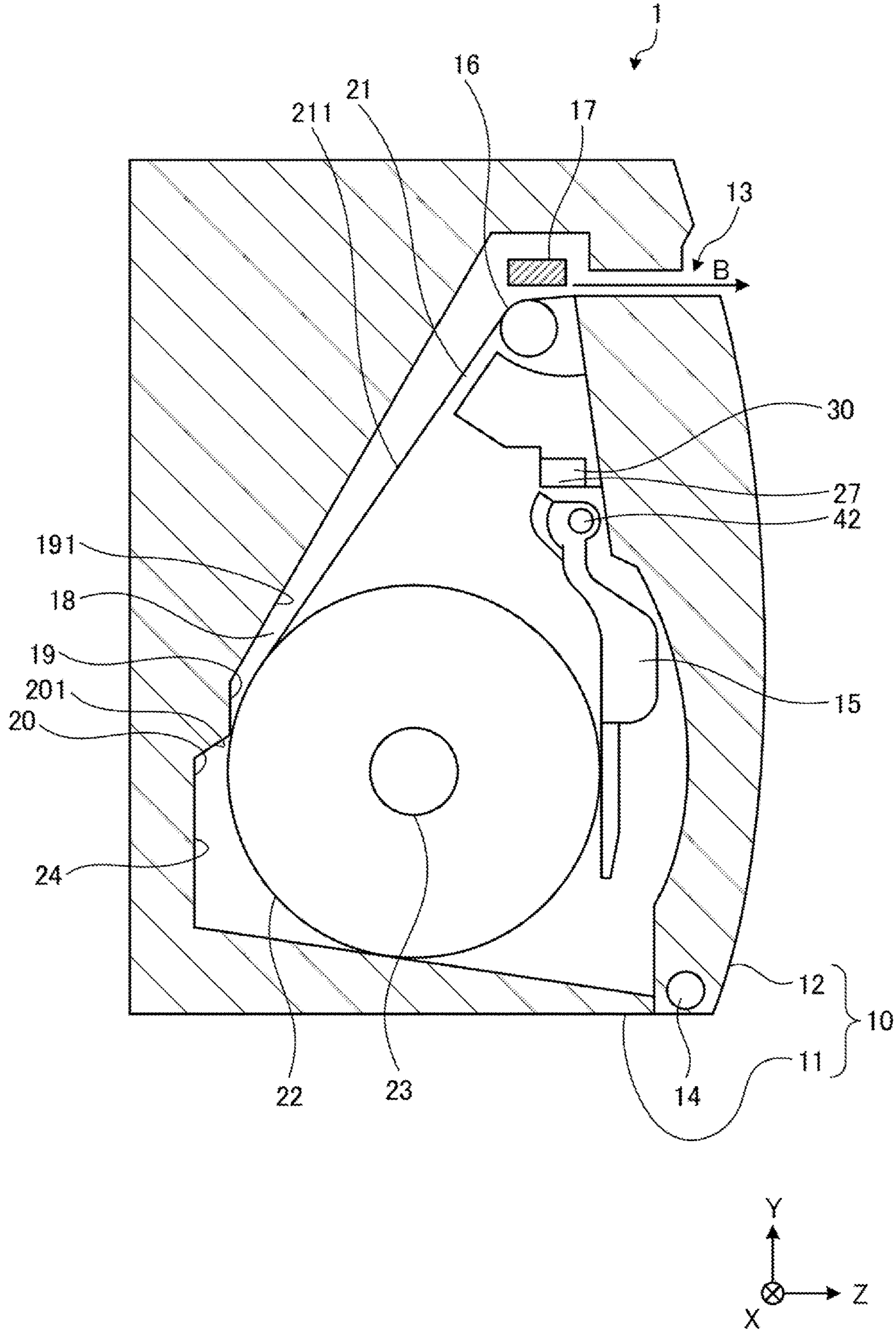
FIG. 2 is a first YZ cross-sectional view of an interior configuration of the thermal printer.
Figure 3:
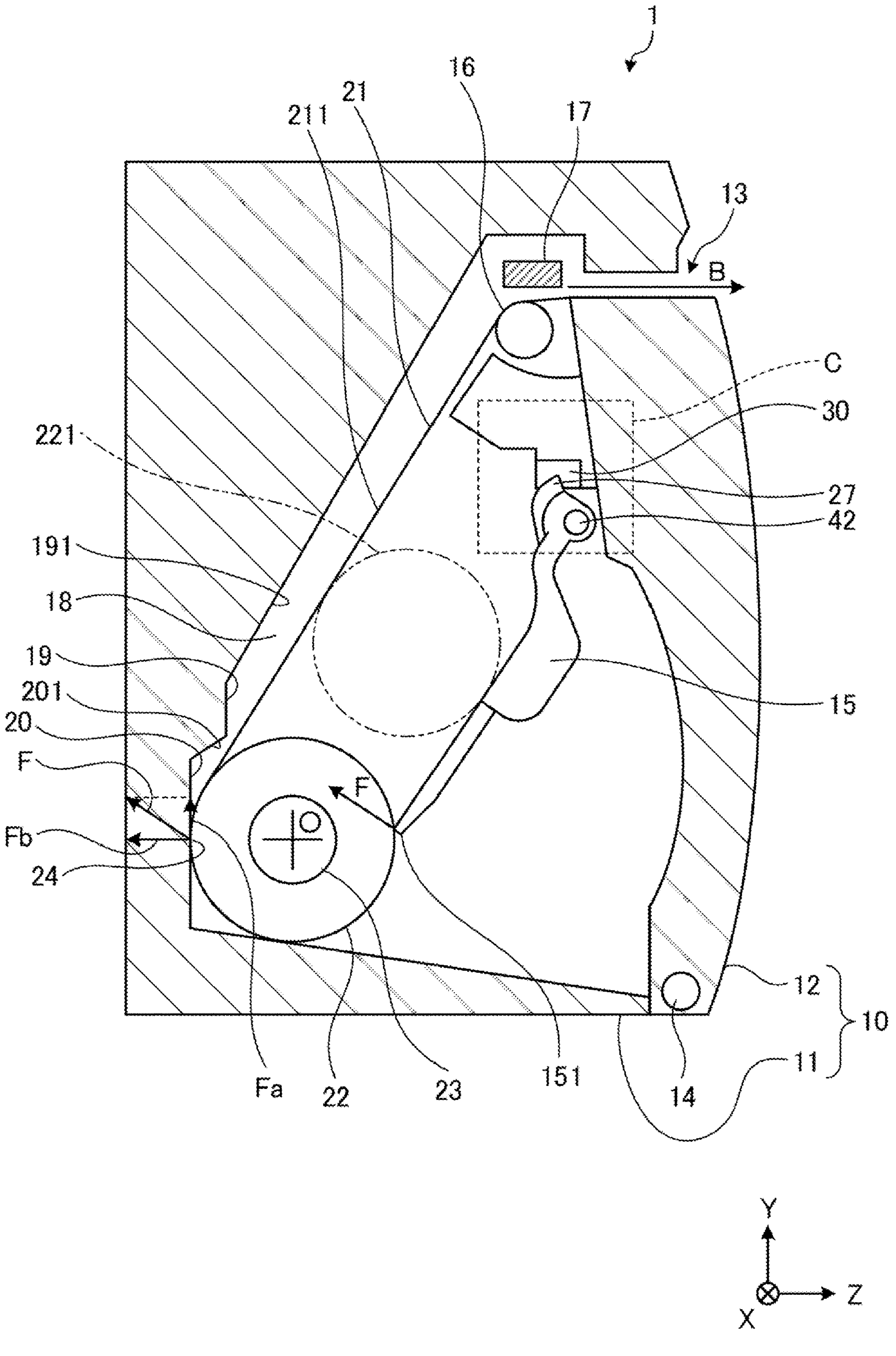
FIG. 3 is a second YZ cross-sectional view of an internal configuration of the thermal printer.

Next, the internal structure of the thermal printer 1 will be described with reference to FIGS. 2 and 3. FIG. 3 is a YZ cross-sectional view of the thermal printer 1 according to an embodiment. As shown in FIGS. 2 and 3, the thermal printer 1 stores a thermal paper 21 as a rolled sheet 22 wound around a roll core 23 in a roll shape in the storage unit 18 of the housing 10, and performs printing while drawing the thermal paper 21 out of the rolled sheet 22.

The rolled sheet 22 in FIG. 2 shows a state in which the remaining amount of the rolled sheet 22 is sufficient. The rolled sheet 22 in FIG. 3 shows a state in which the remaining amount of the rolled sheet 22 is small (i.e., has reached a predetermined amount). The print sheet is not limited to the thermal paper 21, and may be, for example, a label sheet. The label sheet may include a plurality of strip-shaped labels each having a predetermined size and attached to a strip-shaped base sheet, or may include a plurality of strip-shaped labels without any base sheet.

The thermal printer 1 includes a flapper 15, a platen roller 16, a thermal head 17, and the storage unit 18 inside the housing 10.

The thermal printer 1 draws the thermal paper 21 from the rolled sheet 22 by the rotation of the platen roller 16, and performs printing on the drawn thermal paper 21 by the thermal head 17.

The flapper 15 is also referred to as a pressing member. The flapper 15 is provided on the rear side of the upper cover 12. The flapper 15 is rotatably attached to the upper cover 12 an end portion of the side close to the thermal head 17, and with its rotation, the rolled sheet 22 accommodated in the storage unit 18 is pressed in a direction away from the upper cover 12 side against an inner wall 19 of the storage unit 18.

Figure 4:
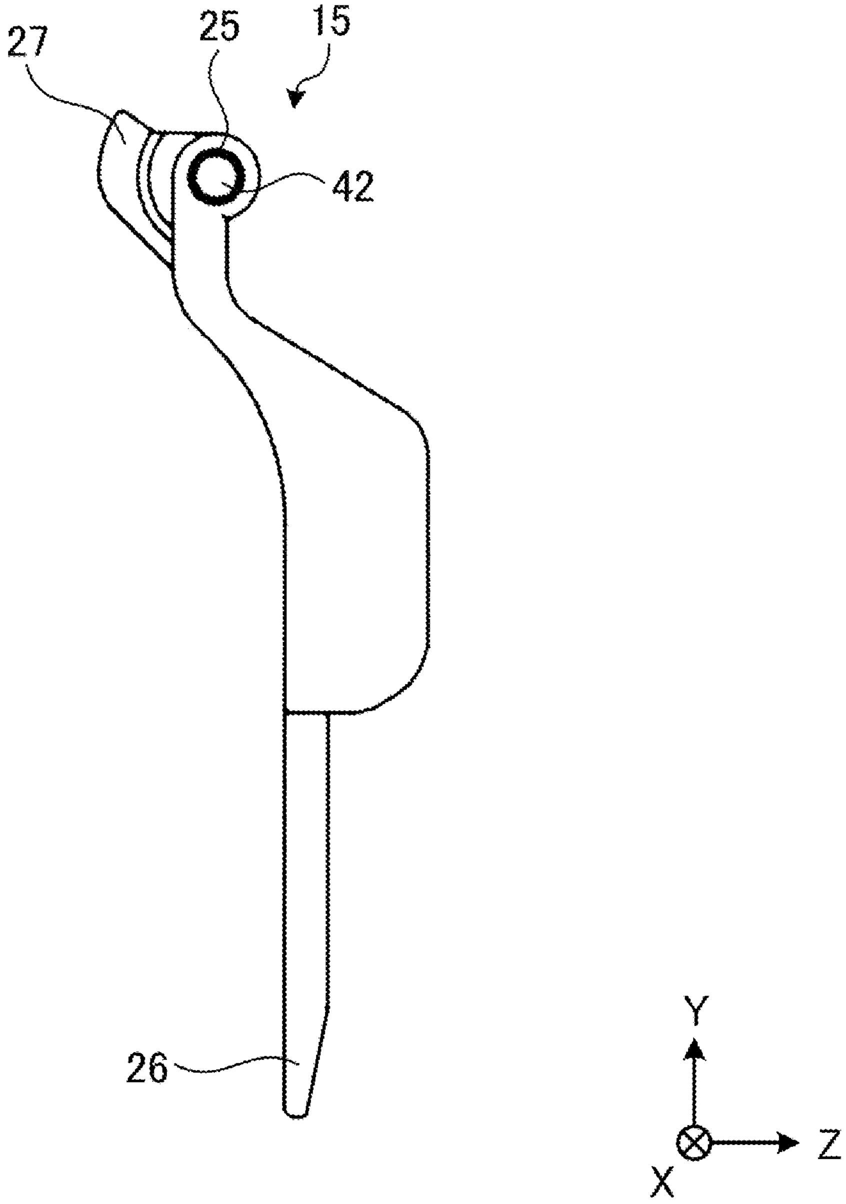
FIG. 4 is a side view of a shape of a flapper of the thermal printer.
Figure 5:
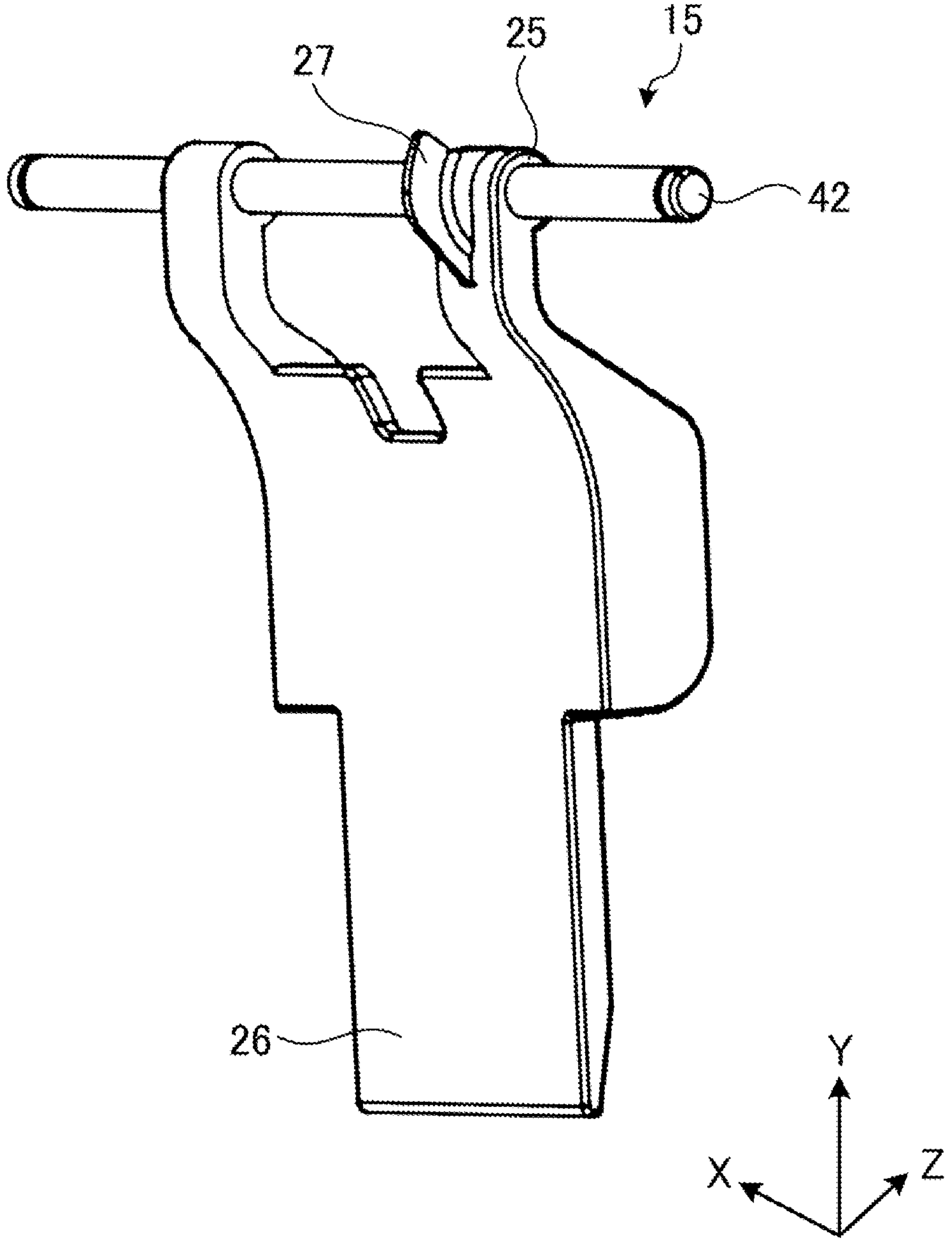
FIG. 5 is a perspective view of a shape of the flapper.

Here, the shape of the flapper 15 will be described. FIG. 4 is a side view illustrating an example of the shape of the flapper 15. FIG. 5 is a perspective view illustrating the example of the shape of the flapper 15.

A flapper base portion 25 at the base of the flapper includes a flapper rotation shaft 42. The flapper rotation shaft 42 is rotatably supported along the rear surface of the upper cover 12. Further, a sheet holding unit 26 is formed at the leading end of the flapper 15.

The sheet holding unit 26 is a member extending from the flapper base portion 25 at the root of the flapper 15 to the Y-axis direction negative side. The sheet holding unit 26 is brought into contact with the rolled sheet 22 to press the outer peripheral surface of the rolled sheet 22 against the storage unit 18 described later.

The flapper 15 is mounted along the rear surface side of the upper cover 12 so as to be rotatable around the flapper rotation shaft 42 in a state of being biased in the direction of the rolled sheet 22 accommodated in the storage unit 18.

Further, the flapper base portion 25 includes a protruding portion 27 which is a thin piece protruding in the radial direction around the flapper rotation shaft 42. The protruding portion 27 is a member that is provided at an end portion of the flapper base portion 25 that is rotatably attached to the upper cover 12 and protrudes in the radial direction of the rotation. The protruding portion 27 is a member for causing a photosensor 30 to detect that the remaining amount of the rolled sheet 22 has reached a predetermined amount.

In FIG. 4, the protruding portion 27 protrudes toward the positive side in the Y-axis direction with respect to the flapper base portion 25. The protruding portion 27 faces the sheet holding unit 26. The detection of the protruding portion 27 by the photosensor 30 will be described later.

The shape of the sheet holding unit 26 is not limited to the example of FIG. 5. For example, the sheet holding unit 26 may include a plurality of members for holding the sheet.

Returning to FIGS. 2 and 3, the flapper rotation shaft 42 is installed along the X-axis at a position on the positive side in the Y-axis direction with respect to the upper cover rotation shaft 14 by which the upper cover 12 is rotated. Note that, for example, a torsion spring (not shown) is attached to the flapper rotation shaft 42, and the flapper 15 is biased by the torsion spring in the direction of the rolled sheet 22 accommodated in the storage unit 18.

The platen roller 16 is installed along the rear surface side of the upper cover 12. The platen roller 16 operates as a conveying unit. The platen roller 16 is rotated by a driving force transmitted from a stepping motor (not shown) to pull out the thermal paper 21 from the rolled sheet 22 stored in the storage unit 18 and convey it from the storage unit 18, which is an upstream side, toward the thermal head 17, which is a downstream side.

The thermal head 17 is installed along the inner surface of the lower housing 11. The thermal head 17 operates as a printing unit. The thermal head 17 is in close contact with the platen roller 16 in a state where the upper cover 12 is closed. The thermal head 17 performs printing on the thermal paper 21 conveyed by the platen roller 16. The thermal paper 21 is conveyed toward the discharge port 13 in a state of being sandwiched between the thermal head 17 and the platen roller 16.

The thermal head 17 has a structure in which a plurality of heating elements are aligned, and performs printing on the thermal paper 21 sandwiched between the thermal head 17 and the platen roller 16 by causing the heating elements corresponding to a printing pattern to generate heat.

The storage unit 18 stores the rolled sheet 22, which is the thermal paper 21 wound around the roll core 23 in a roll shape. The storage unit 18 includes the inner wall 19 and a recessed portion 20. The rolled sheet 22 is accommodated in the storage unit 18 in a state of being in contact with the inner wall 19.

The inner wall 19 has a wall surface extending to the positive side in the Z-axis direction, and has an inclined surface rising toward the discharge port 13 along the positive side in the Y-axis direction. The inner wall 19 includes the recessed portion 20.

The recessed portion 20 is provided at a position where the rolled sheet 22 that has reached a predetermined amount is pressed against the inner wall 19 of the storage unit 18 by the flapper 15. The recessed portion 20 is located in the vicinity of a corner formed by the bottom surface of the housing 10 in the vertical position and the bottom surface in the horizontal position. When the rolled sheet 22 pressed by the flapper 15 reaches the predetermined amount, it is pressed against the recessed portion 20.

The recessed portion 20 further includes a convex portion 201 (or a step portion). The convex portion 201 is provided at an edge of the recessed portion 20 on the side close to the thermal head 17 so as to form a step on the inner wall 19.

In FIG. 3, the rolled sheet 22 accommodated in the storage unit 18 is supported at three points: a contact point with the flapper 15, a contact point with the recessed portion 20, and a contact point with the inclined surface of the recessed portion 20. Among them, the thermal paper 21 is pulled out from the rolled sheet 22 at the contact point with the vertical direction of the recessed portion 20. Hereinafter, the contact point between the rolled sheet 22 and the vertical side of the recessed portion 20 is referred to as an extraction point 24.

The flapper 15 is rotatably attached to the upper cover 12 by the flapper rotation shaft 42. The rolled sheet 22 is pressed against the recessed portion 20 or the inner wall 19 by being pressed by the flapper 15 which rotates clockwise in FIGS. 2 and 3.

When the force applied to the contact point 151 between the flapper 15 and the rolled sheet 22 is F, the force applied to the extraction point 24 of the recessed portion 20 with the rolled sheet 22 is divided into a component force Fa toward the positive side of the Y-axis and a component force Fb toward the negative side of the Z-axis. That is, the rolled sheet 22 is pressed against the inner wall 19 so as to have a pressing force toward the direction (i.e., Y-axis positive side) in which the thermal paper 21 is pulled out. In addition, the flapper 15 has a surface that is substantially parallel to the inner wall 19 in a state in which the rolled sheet 22 that has reached the predetermined amount is pressed.

As a result, the rolled sheet 22 is pressed toward the direction in which the thermal paper 21 is drawn out at the extraction point 24, regardless of the state in which printing is performed on the thermal paper 21 and the state in which printing is not performed. As described above, the flapper 15 suppresses the movement of the rolled sheet 22 inside the recessed portion 20.

When the rolled sheet 22 comes into contact with the convex portion 201 (not shown), the rolled sheet 22 comes into contact with the convex portion 201. When the convex portion 201 and the rolled sheet 22 come into contact with each other, movement of the rolled sheet 22 inside the recessed portion 20 is suppressed.

The thermal paper 21 drawn out from the extraction point 24 is conveyed in the direction of the arrow B as the platen roller 16 rotates. A front surface 211 of the thermal paper 21 is a printing surface. Printing is performed on the front surface 211 of the thermal paper 21 by the thermal head 17. The printed thermal paper 21 is discharged from the discharge port 13.

The discharge port 13 is provided with a cutter (not shown). The user of the thermal printer 1 cuts the thermal paper 21 that has been discharged after the printing is completed by the cutter.

The rolled sheet 221 shown in FIG. 3 indicates the position of the rolled sheet 221 inside the storage unit 18 when the rolled sheet 221 is a label paper wound without a base sheet. In the case of label paper, the front surface of the label paper is a printing surface, and the back surface is an adhesive layer. When the label paper is held in a state of being sandwiched between the platen roller 16 and the thermal head 17, since the back surface of the label paper is adhesive, the rolled sheet 221 is held along the inclined surface 191.

The photosensor 30 is installed on the inner surface of the upper cover 12. The photosensor 30 detects that the remaining amount of the rolled sheet 22 has reached a predetermined amount, that is, that the thermal paper 21 has run out of paper (i.e., near-end).

The photosensor 30 detects a portion of the flapper that presses the rolled sheet 22 whose remaining amount has reached a predetermined amount, which is displaced by rotation. The photosensor 30 is provided at any position where the protruding portion 27 can be detected when the flapper 15 presses the rolled sheet 22 that has reached the predetermined amount. That is, when the remaining amount of the rolled sheet 22 has reached the predetermined amount, the photosensor 30 overlaps with the protruding portion 27 when viewed from the positive side in the Z-axis direction.

The photosensor 30 is, for example, a transmissive photosensor in which a light emitter that emits light and a light receiver that receives light are integrated. For example, the photosensor 30 is formed in a substantially U-shape, and when viewed from the positive side in the Z-axis direction, the opening of the U-shape is arranged toward the negative side in the Y-axis direction (see FIGS. 7 and 8).

For example, the light emitter is an LED (Light Emitting Diode), and the light receiver is a photodiode or a phototransistor. The light receiver outputs different signals depending on whether the light emitted by the light emitter has been reflected and received.

Figure 6:
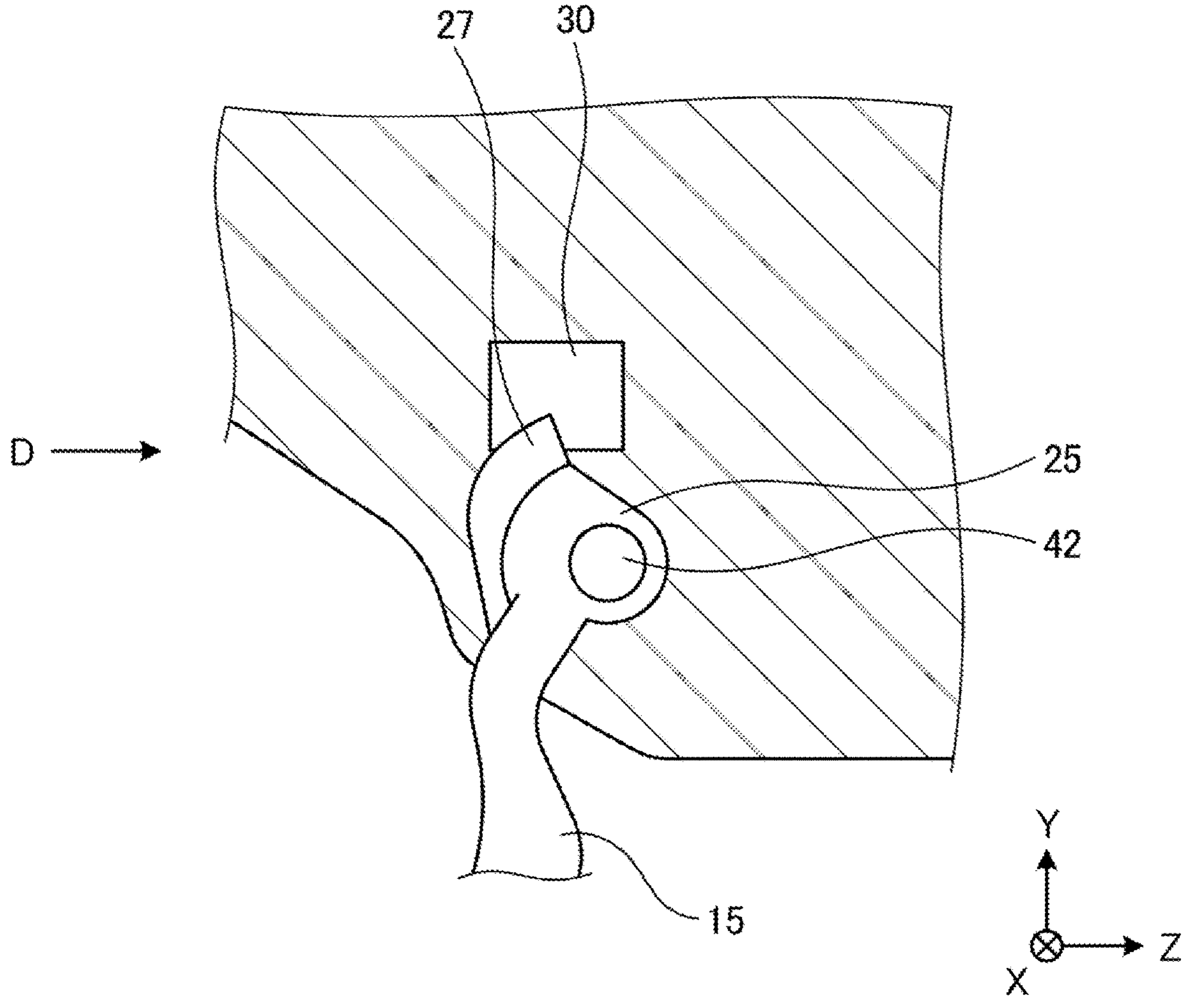
FIG. 6 depicts a positional relationship between a photosensor and the flapper of the thermal printer.

Next, the positional relationship between the flapper and the photosensor 30 will be described. FIG. 6 is an enlarged view of the region C shown in FIG. 3. The positional relationship between the flapper 15 and the photosensor 30 shown in FIG. 6 indicates a state in which the remaining amount of the rolled sheet 22 has reached the predetermined amount.

In FIG. 6, the protruding portion 27 of the flapper is within a detection area of the photosensor 30. The protruding portion 27 is within an angular range detectable by the photosensor 30 when the flapper 15 presses the rolled sheet 22 having the predetermined amount or less.

With this configuration, the photosensor 30 detects that the remaining amount of the rolled sheet 22 has reached the predetermined amount by detecting the protruding portion 27. Then, the thermal printer 1 issues a signal that notifies that the remaining amount of the rolled sheet 22 has reached the predetermined amount to turn on or blink an indicator such as a lamp or an LED disposed on an outer surface of the lower housing 11 or the upper cover 12, for example. Additionally or alternatively, the thermal printer 1 can issue a signal that notifies a host computer (not shown) connected thereto via a network interface circuit that the remaining amount of the rolled sheet 22 has reached the predetermined amount. Such signals may be issued and output by a controller, a control circuit, or a processor of the thermal printer 1 (not shown) for controlling various components of the thermal printer 1 including the platen roller 16 and the thermal heat 17.

Figure 7:
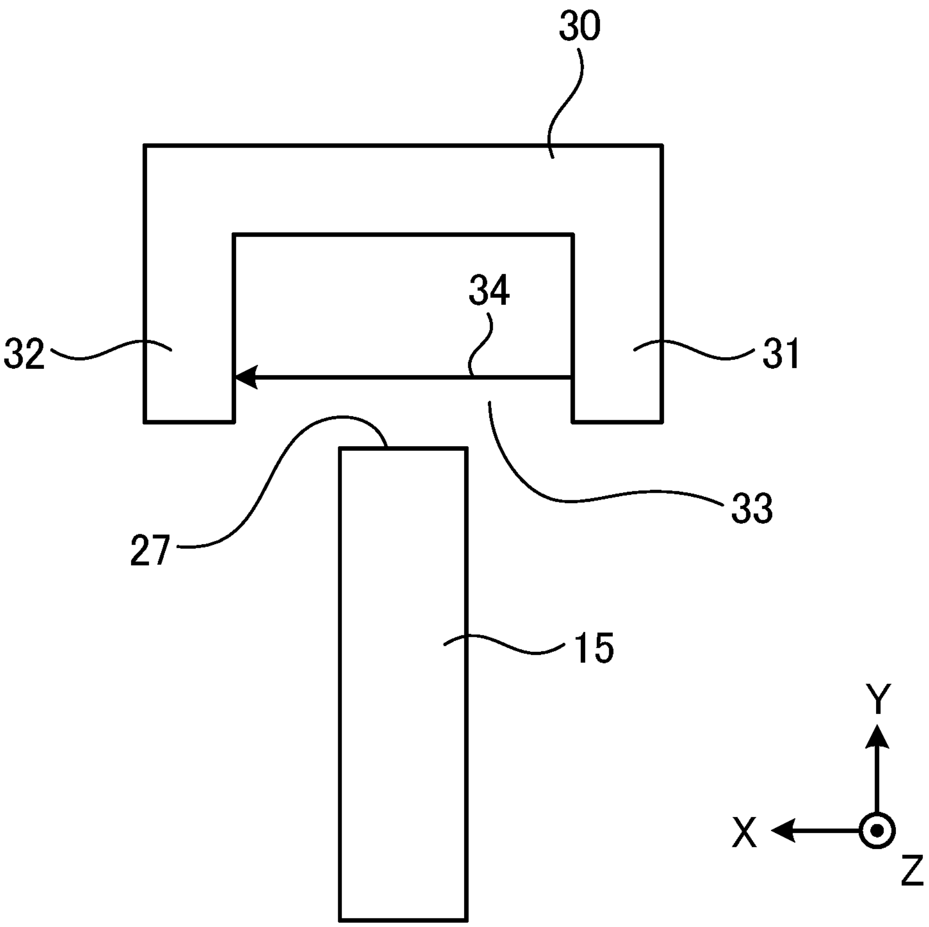
FIG. 7 is a first diagram of a method of detecting a remaining amount of a rolled sheet by the photosensor.
Figure 8:
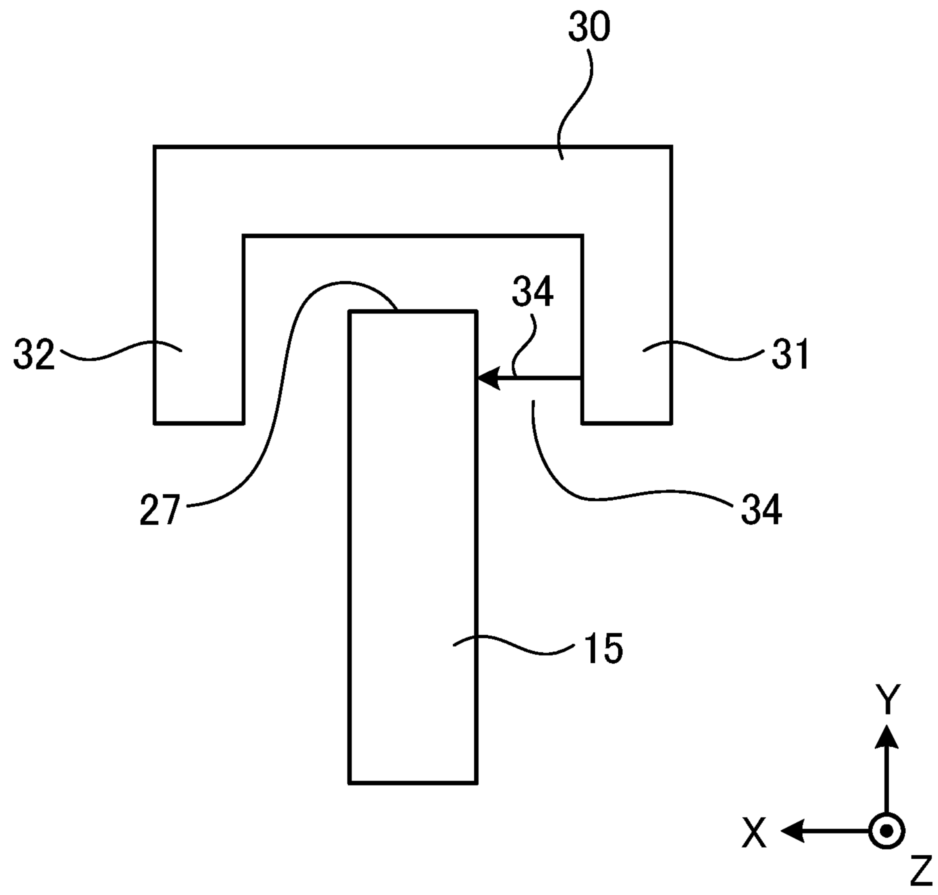
FIG. 8 is a second diagram of a method of detecting a remaining amount of a rolled sheet by the photosensor.

Next, a method in which the photosensor 30 detects the remaining amount of the rolled sheet 22 will be described. FIG. 7 and FIG. 8 are diagrams for explaining a method by which the photosensor 30 detects the remaining amount of the rolled sheet 22.

FIG. 7 shows the positions of the flapper 15 and the photosensor 30 when the remaining amount of the rolled sheet 22 has not reached the predetermined amount, that is, the remaining amount of the rolled sheet 22 is sufficiently present. FIG. 8 shows the positions of the flapper 15 and the photosensor 30 when the remaining amount of the rolled sheet 22 has reached the predetermined amount, that is, the remaining amount of the rolled sheet 22 is small.

In the present embodiment, one end of a substantially U-shape of the photosensor 30 includes a light emitter 31, and the other end includes a light receiver 32. The light emitter 31 emits light 34 toward the light receiver 32. Note that the position of the light emitter 31 and the position of the light receiver 32 may be reversed in implementation.

As shown in FIG. 7, when the remaining amount of the rolled sheet 22 has not reached the predetermined amount, the light receiver 32 receives the light 34 emitted from the light emitter 31 because there is no obstruction in the opening 33 between the light emitter 31 and the light receiver 32 of the photosensor 30. In this case, the light receiver 32 outputs a signal indicating that the light 34 emitted from the light emitter 31 is received.

As shown in FIG. 8, when the remaining amount of the rolled sheet 22 has reached the predetermined amount, the protruding portion 27 is present in the opening 33 of the light emitter 31 and the light receiver 32 of the photosensor 30. Therefore, the light receiver 32 does not receive the light 34 emitted from the light emitter 31. In this case, the light receiver 32 outputs a signal indicating that the light 34 emitted from the light emitter 31 is not received.

As described above, the photosensor 30 can detect the state when the remaining amount of the rolled sheet 22 has reached the predetermined amount by detecting the protruding portion 27. Therefore, the thermal printer 1 can detect that the remaining amount of the rolled sheet 22 has reached the predetermined value.

The thermal printer 1 can notify that the remaining amount of the rolled sheet 22 has reached the predetermined amount by turning on or blinking an indicator (not shown). Alternatively, the thermal printer 1 can notify a host computer (not shown) connected thereto that the remaining amount of the rolled sheet 22 has reached the predetermined amount. The user can prepare the replacement rolled sheet 22 in advance after confirming the indicator lit or blinking or the display on the host computer (for example, a liquid crystal display connected to the host computer).

Further, since the protruding portion 27 is provided in a certain angular range surrounding the flapper rotation shaft 42, it is possible to continue the detection by the photosensor 30 not only when the remaining amount of the rolled sheet 22 pressed by the flapper 15 has reached the predetermined amount but also when the remaining amount is further reduced. Accordingly, it is possible to prevent the near-end notification from being missed.

Further, in the present embodiment, since the convex portion 201 is provided at the edge of the recessed portion 20, when the thermal paper 21 is pulled out from the rolled sheet 22, the rolled sheet 22 can be hardly pulled out from the recessed portion 20. Thus, the near-end detection of the rolled sheet 22 can be accurately performed.

Further, as in the present embodiment, when the flapper 15 and the inner wall 19 face each other substantially in parallel at the near end of the rolled sheet 22, the near end detection can be accurately performed even if the rolled sheet 22 escapes from the recessed portion 20, for example. Such a configuration is also suitable, for example, in a case where the rolled sheet 22 is a label paper wound without a base sheet, and the rolled sheet 22 is supposed to move toward the thermal head 17 at the time of paper conveyance.

As described above, in the thermal printer 1 according to the present embodiment, as the flapper 15 rotates, the rolled sheet 22 is pressed against the inner wall 19 of the storage unit 18 by pressing in a direction away from the upper cover 12, and the recessed portion 20 is provided at a position where the rolled sheet 22 that has reached the predetermined amount is pressed by the flapper 15.

Therefore, even in a state where the remaining amount of the rolled sheet 22 is small, the thermal printer 1 can have a pressing force toward the direction in which the thermal paper 21 is pulled out by pressing the rolled sheet 22 against the recessed portion 20. Thus, the rolled sheet 22 can be accommodated in the storage unit 18 even in a state where the remaining amount of the rolled sheet 22 is small.

Further, even in a state where the remaining amount of the rolled sheet 22 is small, the thermal printer 1 accommodates the rolled sheet 22 in the storage unit 18, so that the photosensor 30 can detect the protruding portion 27 included in the flapper 15. Further, the photosensor 30 can detect the state when the remaining amount of the rolled sheet 22 has reached the predetermined amount by detecting the protruding portion 27. Therefore, the thermal printer 1 can detect that the remaining amount of the rolled sheet 22 has reached a predetermined value.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A printer comprising:
- a housing in which a sheet is stored in a rolled shape;
- a head by which an image is printed on the sheet;
- a flapper biased to pivot around an axis at a first end of the flapper, the flapper including:
  - a surface extending from the first end in a first direction perpendicular to the axis and by which the stored sheet is pressed against the housing, and
  - a protrusion disposed at the first end of the flapper and protruding towards a second direction that is perpendicular to the axis and different from the first direction;
- a sensor including:
  - a first surface parallel to the second direction and in which a light emitter is disposed, and
  - a second surface facing the first surface and in which a light receiver is disposed, wherein
  - the sensor is configured to output a first signal in response to light emitted from the light emitter being received by the light receiver, and
  - the sensor is positioned such that the protrusion of the flapper enters a space between the first and second surfaces when the flapper is at a predetermined rotational position around the axis; and
- a controller configured to issue a second signal in response to an absence of the first signal that is output from the sensor, wherein
- the housing includes a recess, a step portion, and an inclined surface that are arranged along a conveyance path of the sheet, the step portion being between the recess and the inclined surface and protruding towards the conveyance path with respect to a bottom surface of the recess and the inclined surface, and
- the protrusion of the flapper enters the space between the first and second surfaces of the sensor when the stored sheet having a diameter less than a predetermined diameter is positioned either in the recess or on the inclined surface.

2. The printer according to claim 1, further comprising:
- a cover for an opening of the housing through which the sheet is set, wherein
- the surface of the flapper presses the stored sheet in a direction away from the cover.

3. The printer according to claim 1, wherein the recess is located in the vicinity of a corner formed by a bottom surface of the housing and a side surface thereof, the side surface being connected to the bottom surface, and
- the recess, the step portion, and the inclined surface are formed along the side surface of the housing.

4. The printer according to claim 1, further comprising:
- a cover for an opening of the housing through which the sheet is set, wherein
- the inclined surface is inclined with respect to the cover when the cover fully covers the opening of the housing.

5. The printer according to claim 4, wherein
- the head is located at one end of the inclined surface.

6. The printer according to claim 1, wherein the flapper includes a torsion spring that generates a bias force for the flapper.

7. The printer according to claim 1, wherein the sheet is a thermal sheet, and the head includes a plurality of heating elements to form the image on the thermal sheet.

8. The printer according to claim 1, wherein
the step portion prevents the sheet in the recess from moving towards the head.

9. The printer according to claim 1, wherein
the inclined surface is flat, and
when the protrusion is at a particular location in the space, the surface of the flapper becomes parallel to the inclined surface.

10. The printer according to claim 1, further comprising:
a cover for an opening of the housing through which the sheet is set, wherein
both the sensor and the flapper are attached to the cover.

11. A printer comprising:
a housing in which a sheet is stored in a rolled shape;
a head by which an image is printed on the sheet;
a flapper biased to pivot around an axis at a first end of the flapper such that the stored sheet is pressed by a surface of the flapper against the housing;
a protrusion disposed at the first end of the flapper, protruding towards a first direction that is perpendicular to the axis, and rotatable that rotates around the axis as the flapper pivots;
a sensor including
a first surface parallel to the first direction and in which a light emitter is disposed, and
a second surface facing the first surface and in which a light receiver is disposed, wherein
the sensor is configured to output a first signal in response to light emitted from the light emitter being received by the light receiver, and
the sensor is positioned such that the protrusion enters a space between the first and second surfaces when the protrusion is at a predetermined rotational position around the axis; and
a controller configured to issue a second signal in response to an absence of the first signal that is output from the sensor, wherein
the housing includes a recess, a step portion, and an inclined surface that are arranged along a conveyance path of the sheet, the step portion being between the recess and the inclined surface and protruding towards the conveyance path with respect to a bottom surface of the recess and the inclined surface, and
the protrusion enters the space between the first and second surfaces of the sensor when the stored sheet having a diameter less than a predetermined diameter is positioned either in the recess or on the inclined surface.

12. The printer according to claim 11, further comprising:
a cover for an opening of the housing through which the sheet is set, wherein
the flapper presses the stored sheet in a direction away from the cover.

13. The printer according to claim 11, wherein
the recess is located in the vicinity of a corner formed by a bottom surface of the housing and a side surface thereof, the side surface being connected to the bottom surface, and
the recess, the step portion, and the inclined surface are formed along the side surface of the housing.

14. The printer according to claim 11, further comprising:
a cover for an opening of the housing through which the sheet is set, wherein
the inclined surface is inclined with respect to the cover when the cover fully covers the opening of the housing.

15. The printer according to claim 14, wherein
the head is located at one end of the inclined surface.

16. The printer according to claim 11, wherein the flapper includes a torsion spring that generates a bias force for the flapper.

17. The printer according to claim 11, wherein the sheet is a thermal sheet, and the head includes a plurality of heating elements to form the image on the thermal sheet.

18. The printer according to claim 11, wherein
the step portion prevents the sheet in the recess from moving towards the head.

19. The printer according to claim 11, wherein
the inclined surface is flat, and
when the protrusion is at a particular location in the space, the surface of the flapper becomes parallel to the inclined surface.

20. The printer according to claim 11, further comprising:
a cover for an opening of the housing through which the sheet is set, wherein
both the sensor and the flapper are attached to the cover.

* * * * *